United States Patent [19]

Gibb et al.

[11] 4,082,115

[45] Apr. 4, 1978

[54] VALVE OPERATOR

[75] Inventors: George H. Gibb, Swampscott; Henry A. Rabeau, Haverhill, both of Mass.

[73] Assignee: General Electric Company, Schenectady, N.Y.

[21] Appl. No.: 714,351

[22] Filed: Aug. 16, 1976

[51] Int. Cl.² .................. F15B 13/10; F16K 11/14; F16K 31/163
[52] U.S. Cl. ................... 137/630.2; 60/403; 91/368; 91/391 R; 251/14; 251/58; 251/263
[58] Field of Search ............ 60/403; 91/367, 453; 415/40; 137/601, 630.19, 630.2, 635, 637; 251/14, 263

[56] References Cited

U.S. PATENT DOCUMENTS

| | | | |
|---|---|---|---|
| 2,613,542 | 10/1952 | Van Nest et al. | 137/630.19 X |
| 2,622,617 | 12/1952 | Sederquist | 251/14 |
| 2,713,351 | 7/1955 | Van Nest et al. | 137/630.19 |
| 3,403,891 | 10/1968 | Johnson et al. | 415/43 X |
| 3,422,831 | 1/1969 | Straney et al. | 137/22 |
| 3,441,040 | 4/1969 | Gray | 415/41 |
| 3,551,066 | 12/1970 | Sakamoto et al. | 415/40 |
| 3,901,274 | 8/1975 | Taber et al. | 137/637 X |

*Primary Examiner*—Martin P. Schwadron
*Assistant Examiner*—Richard Gerard

*Attorney, Agent, or Firm*—James W. Mitchell; John F. Ahern; Herbert E. Messenger

[57] ABSTRACT

A valve operator for steam turbine inlet control valves, each of the control valves being set by a corresponding valve cam. The operator comprises pilot operated hydraulic means for positioning the valve cams in a normal or power mode of operation, mechanical means for positioning the valve cams in a back-up or manual mode of operation and manual actuation means for actuating the hydraulic means in a normal mode of operation and, in the event of failure of the hydraulic means, for automatically actuating the mechanical means in a back-up mode of operation. The hydraulic actuator positions the valve cams through a rack and pinion assembly. Both the hydraulic means and the mechanical means are actuated from an input shaft driving a reduction gear box. The mechanical means comprises a dog connected to the output of the gear box and a pin on the cam shaft driven by the dog in the manual mode of operation. In the hydraulic mode of operation a feedback cam and the pin are rotated faster than the dog, thereby precluding the engagement of the pin by the dog, so that the opening force is provided solely by the hydraulic means. In the event of failure of the hydraulic means, rotation of the feedback cam and the pin by the hydraulic means terminates and the dog rotates into engagement with the pin. Thereafter, rotation of the valve cams is effected by means of the manual input to the input shaft.

13 Claims, 6 Drawing Figures

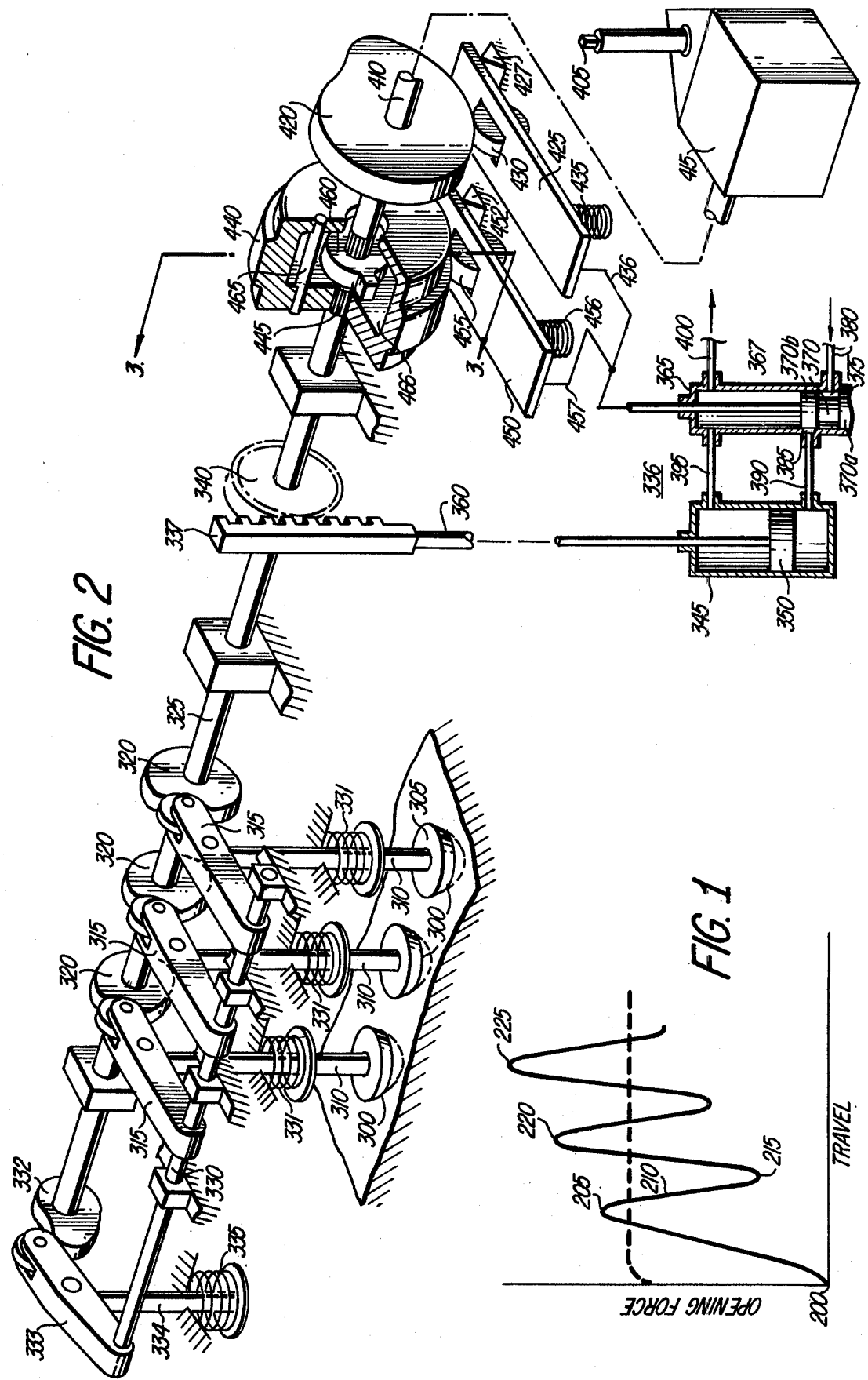

VALVE OPERATOR

BACKGROUND OF THE INVENTION

The invention herein described was made in the course of and under a contract with the U.S. Department of Navy.

1. Field of the Invention

This invention relates in general to a valve operator for inlet control valves disposed upstream from a fluid driven machine such as a steam turbine and more particularly is directed to a valve operator capable of actuating the inlet control valves either by hydraulic power or by manual operation.

2. Description of the Prior Art

Steam turbines are controlled by inlet control valves disposed in a steam line upstream from the turbine. Setting of these inlet control valves controls the flow of steam to the turbine and thereby controls the speed at which the turbine operates. Normally, high steam pressures within the environment in which the inlet control valves operate dictate that these valves be actuated by some sort of power operator. It has been the practice to employ hydraulic actuators controlled by pilot valves to provide the necessary power for actuating the inlet control valves. However, in certain applications such as where the steam turbine is used to drive large ocean-going vessels, there must be provided a manual operator as a back-up for the hydraulic power operator should the hydraulic power operator fail as the result of, for example, disruption in the hydraulic fluid circuit serving the hydraulic actuator and the pilot valve. In order for a manual operator to function as a back-up for an hydraulic power operator, it is necessary that a considerable mechanical advantage be designed into the manual operator so that the force requirements for setting the valves may be met by input forces consistent with the capabilities of a human being.

One prior art practice has been to arrange the inlet control valves in a straight line with each valve carried by a lift bar. A lift bar is normally a solid member apertured in a plurality of locations along the length thereof, each aperture accepting an inlet control valve stem. Each stem has disposed on one end thereof a valve disc and on the other end thereof a stop engageable by an upper surface of the lift bar. Each stem is slidable within a corresponding aperture in the lift bar. The stems are sized so that as the lift bar is moved in a valve opening direction, each stop engages the lift bar in a predetermined sequence so that the inlet control valves open in that sequence. The details of such an arrangement are disclosed in U.S. Pat. No. 2,613,542 to Van Nest and Wales, which is assigned to the assignee of the present invention. As each inlet control valve is opened, the operator must overcome the weight of the valve and the force on the valve disc due to the pressure drop across the valve. As the valve unseats, the pressure drop across the valve decreases and the operator need only apply a force sufficient to overcome the weight of the valve itself. Therefore, it can be seen that during a time interval in which a plurality of such inlet control valves are opened there will be short periods of time when the operator must overcome extremely high forces, i.e., due to the pressure drop across a particular valve and the weight of the valves, and intervals between those time periods when the forces which the operator must overcome are lesser (those associated with the weight of the valves). These extremely high forces which the operator must overcome may not be compatible with the capabilities of a human employing the operator in a manual or back-up mode.

By the present invention, the mechanical advantage associated with a valve operator employed in a manual or back-up mode may be tailored so that, in operation, the force requirements for opening the inlet control valves are compatible with the strength capabilities of a human being. Moreover, the present invention provides an inlet control valve operator actuated from the same member in both the power and manual modes of operation, a mechanical advantage consistent with the strength capabilities of a human being taking effect automatically upon initiation of the manual or back-up mode of operation.

It is, therefore, an object of the present invention to provide an operator for steam turbine inlet control valves with power and manual operating capabilities, wherein the forces required to open the inlet control valves are consistent with the capabilities of a human employing the operator in a manual or back-up mode of operation.

It is another object of the present invention to provide an operator for steam turbine inlet control valves, the operator being actuated from the same member in both the power and manual modes of operation and providing a mechanical advantage consistent with the strength capabilities of a human being which takes effect automatically upon initiation of the manual or back-up mode of operation.

It is another object of this invention to provide a more effective biasing force for achieving a tight seal of the valves in the closed position.

SUMMARY OF THE INVENTION

These and other objects apparent from the following detailed description taken in connection with the appended claims and the accompanying drawings are attained by providing a valve operator for steam turbine inlet control valves, each of the control valves being set by a corresponding valve cam. The cams are disposed in axially spaced relationship along a cam shaft. Although valve cams have been employed in the prior art in conjunction with inlet control valves, the operator of the present invention takes advantage of the inherent characteristics of such valves to make the forces required to open these valves consistent with the capabilities of a human employing the operator in a manual or back-up mode of operation. The operator comprises hydraulic means for positioning the valve cams in a normal or power mode of operation, mechanical means for positioning the valve cams in a back-up or manual mode of operation and manual actuation means for actuating the hydraulic means in a normal mode of operation and, in the event of failure of the hydraulic means, for automatically actuating the mechanical means in a back-up mode of operation. The hydraulic means comprises an hydraulic actuator controlled by a pilot valve. The hydraulic actuator positions the valve cams through a rack connected to the hydraulic actuator and a pinion disposed on the cam shaft.

In the preferred embodiment, both the hydraulic means and the mechanical means are actuated from an input shaft driving a reduction gear box. The mechanical means comprises a dog connected to the output of the gear box and a pin driven by the dog in the manual mode of operation. The pin is connected to the cam shaft by means of its disposition on a feedback cam fixed to the cam shaft and employed with the hydraulic means. The hydraulic means is designed such that upon actuation thereof, the valve cams are rotated by the hydraulic actuator. In this hydraulic mode of operation the feedback cam and the pin are rotated faster than the dog, thereby precluding the engagement of the pin by the dog, so that the opening force is provided solely by the hydraulic means. In the event of failure of the hydraulic means, rotation of the feedback cam and the pin by the hydraulic means terminates and the dog rotates into engagement with the pin. Thereafter, rotation of the valve cams is effected by means of the manual input to the input shaft. In the valve closing operation provision is made for overtravel of the cams to insure application of the full force of biasing springs for effecting a tight seal of the valves.

BRIEF DESCRIPTION OF THE DRAWINGS

FIG. 1 shows a curve indicating the relationship between valve opening force and the travel of the lift bar in a prior art inlet control valve operator and a curve indicating the relationship between valve opening force and actuator travel in the valve operator of the present invention.

FIG. 2 is an isometric view of the inlet control valve operator of the present invention partially broken away to show details of a portion of the operator.

DESCRIPTION OF THE PREFERRED EMBODIMENT

Figure 3:
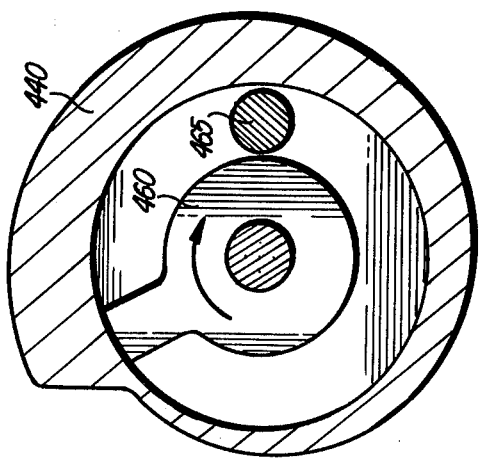
FIG. 3 is a view taken along line 3—3 of FIG. 2 in a configuration wherein the inlet valves are closed.

Referring now to FIG. 1, the solid line shows the general relationship between the force necessary to open the inlet control valves and the travel of the lift bar in a prior art lift bar type of valve opener. At the origin indicated by point 200, all the inlet control valves are closed and no opening force is applied thereto. Point 205 represents the force necessary to (1) overcome the weight of the sequentially first inlet control valve to open and (2) overcome the pressure drop across that valve. As the valve unseats and is further opened, the force required to overcome the pressure drop across the valve decreases (210) until the force applied acts primarily to overcome the weight of the valve itself as indicated at 215. As the lift bar continues to be drawn upwardly, a second valve begins to unseat and the force applied to the lift bar when the second valve begins to unseat must overcome the weight of the first two valves and the pressure drop across the second valve, as is indicated at point 220. It can be seen then that the remaining peak 225 is indicative of the force required to open the third inlet control valve in the sequence.

Therefore, the area under the curve of FIG. 1 represents the work which must be done in opening three inlet control valves. However, should the hydraulic system fail, this work to open the inlet control valves must be supplied manually. Referring again to FIG. 1, it can be seen that the personnel manually opening the inlet control valves must be capable of applying forces equivalent to those represented by points 205, 220 and 225. As the output capabilities of steam turbines increase, the size of inlet control valves employed therewith also increases, as do the pressure drops across those inlet control valves. Therefore, in certain situations it may be extremely difficult, if not impossible, for personnel to manually open the steam turbine inlet control valves should the hydraulic operator for those valves fail.

By the present invention, the mechanical advantage associated with a manual or back-up means for opening the inlet control valves may be tailored to the number, size and sequence of the opening of the valves so that when actuation in a manual or back-up mode is employed a relatively constant force may be applied to open the valves as shown by the dotted line in FIG. 1. Of course, the total work required to open the valves by the operator of the present invention cannot be substantially reduced from that required in prior art operators, but by eliminating the "peaks" of the solid line curve of FIG. 1, the same work can be done with a substantially lesser maximum force applied, thereby insuring that such force will lie within the capabilities of a human being.

Referring now to FIG. 2, there is shown the steam turbine inlet control valve operator of the present invention. Steam ports 300 are closed by inlet control valves 305, each of which is fixed to the lower end of a corresponding one of the valve stems 310. The opposite ends of stems 310 are pinned to followers 315 each of which engages one of a plurality of cams 320 fixed in axially spaced relationship to cam shaft 325. The ends of cam followers 315 opposite those which engage cams 320 are pivotally mounted on a support shaft 330. While only three valves and associated cams have been shown to illustrate the invention, it will be apparent that any desired number may be employed and normally a greater number than three will be utilized.

The valves 305 are biased toward their closed positions by springs 331, one such spring surrounding each of the valve stems 310. It will be apparent that when the last of the valves 305 has reached its closed position, the cam followers 315 will still be in engagement with the corresponding cams 320 against which they are urged by the springs 331. This would prevent the full force of the springs 331 from being available to press the valves 305 against their seats.

In order to permit the full spring force and steam pressure to press the valves 305 against their seats and to cause a tight seal, provision is made for an overtravel region. To accomplish this an additional spring-loaded cam 332 is positioned on the cam shaft 325 beyond the last of the cams 320. A cam follower 333 is mounted on the support shaft 330. A rod 334 depends from the cam follower 333 and a biasing spring 335 surrounds the rod 334 and biases the cam follower against the cam 332. The cam 332 is shaped differently from the cams 320 and specifically shaped so that after the valves 305 have all closed, the biasing force exerted by the spring 335 urging the cam follower 333 against the cam 332, causes counterclockwise overtravel of the cam shaft 325 beyond that effected by the springs 331. This insures that all cams 320 clear their corresponding followers 315, thereby permitting the full force of springs 331 to press the valves 305 against their seats and insuring a tight seal.

The cam 332 is further shaped so that it goes into high dwell near the cracking point of the first valve to open, so that the biasing force of the spring 335 no longer causes the cam follower 333 to exert a force tending to move the cam shaft 325 counterclockwise.

Inlet control valves 305 are set by cams 320 in response to the rotation of cam shaft 325. Cam shaft 325 is rotated by hydraulic means, indicated generally at 336, by means of a rack 337 engaging a pinion 340 fixed to cam shaft 325. The hydraulic means comprises an hydraulic actuator which includes a hydraulic cylinder indicated at 345, and a single-acting piston 350. Piston 350 is connected to rack 337 through piston shaft 360 and causes rack 337 to move in response to movement of the piston. Hydraulic operating fluid or pilot oil is supplied to the bottom of cylinder 345 so as to move piston 350 upwardly in response to control means which includes a hydraulic pilot valve indicated at 365.

The piston 350 is biased downwardly by the springs 331 and the spring 335. The downward bias on piston 350 is effected because the springs 331 and 335 cause the followers 315 and 333 to bear against the cams 320 and 332 and thereby urge the cam shaft 325 and the pinion 340 in a counterclockwise direction. Counterclockwise movement of the pinion 340 biases the rack downwardly and, through the piston shaft 360, biases the piston 350 downwardly. Upward movement of the piston 350 as a result of pilot oil supplied to the bottom of the cylinder 345 is against this bias.

The pilot valve 365 comprises a bushing member 367 having a bore in which pilot 370 is longitudinally slidable. Spaced lands 370a and 370b of pilot 370 define an inlet chamber 375 to which pilot oil at a suitable pressure is supplied from a suitable source (not shown) by way of an inlet conduit 380. Upper pilot land 370b is normally aligned with a port 385 from which a conduit 390 provides communication to the bottom of hydraulic cylinder 345. Any pilot oil leaking past piston 350 is drained by way of conduits 395 and 400. Upward movement of pilot 370 to move land 370b out of alignment with port 385 causes pilot oil from chamber 375 to be admitted to port 385 and, by way of conduit 390, to hydraulic cylinder 345. This causes the piston 350 and thus rack 337 to be moved upwardly to rotate cam shaft 325 clockwise. Clockwise rotation of the cam shaft 325 and the cams 320 mounted thereon causes lifting of the followers 315 and opening of the valves 305. The cams 320 are positioned on the cam shaft 325 in angularly displaced relationship so that the valves 305 are opened sequentially. Conversely, downward movement of pilot 370 to place land 370b below port 385 uncovers port 385 so that pilot oil from hydraulic cylinder 345 drains through conduit 390 and out the top of the pilot bushing by way of drain conduit 400. Upon drainage of pilot oil from cylinder 345 springs 331 and 335 force piston 350 downwardly as previously explained.

The hydraulic means 336 for rotating cam shaft 325 is actuated by the rotation of an input shaft 405. Shaft 405 drives an input cam shaft 410 (aligned with cam shaft 325) through any suitable reduction gear box 415 well-known in the art. An input cam 420, which forms part of the control means, is fixed to input cam shaft 410. A lever 425 is pivotally fulcrumed on a support 427 and includes a follower 430 which is biased into engagement with cam 420 by a suitable biasing spring 435. Lever 425 is connected to pilot 370 through linkage 426, which acts to raise pilot 370 and connect hydraulic cylinder 345 with pilot oil supplied through conduits 380 and 390. As previously explained, this effects upward movement of the piston 350 and rack 337 to open the valves 305 sequentially.

To restore pilot 370 to a position blocking communication with port 385 after the inlet control valves have opened a sufficient amount, there is provided, as part of the control means, a feedback cam 440 splined to cam shaft 325 at 445. A lever 450 is pivotally fulcrumed on a support 452 and includes a cam follower 455 which is biased into engagement with feedback cam 440 by a suitable biasing spring 456. Movement of the feedback cam effects downward movement of pilot 370 through the lever 450 including the cam follower 455 and through a restoring linkage indicated by line 457 connecting pilot 370 and lever 450. A suitable restoring linkage is disclosed in U.S. Pat. No. 2,713,351 to Van Nest. Such a restoring linkage effects the restoring of pilot 370 to its position blocking port 385, thereby discontinuing the movement of piston 350 when the inlet control valves reach the desired positions. Thus, in response to the valves reaching the desired open positions the feedback cam 440 causes the pilot 370 to move to the position shown in FIG. 2 block the supply of pilot oil to the cylinder 345 and thereby discontinue opening movement of the valves.

In the event that the hydraulic means of the inlet control valve operator of the present invention fail for any reason, mechanical means are provided to automatically rotate cam shaft 325 and thus set inlet control valves 305 in a manual or back-up mode of operation. This mechanical means comprises a dog 460 splined to the end of input cam shaft 410 and rotatable with input cam shaft 410 when input shaft 405 is rotated. In the preferred embodiment, the dog 460 is disposed within the interior of feedback cam 440. A pin 465 is fixed to the feedback cam 440 and mounted within an internal chamber 466 formed in the feedback cam 440. The pin 465 is mounted in a position spaced from the cam shaft 325 and extending parallel to the cam shaft. The dog 460 is spaced from the pin 465 in the power, or hydraulic, mode of operation, but engages pin 465 in the manual, or back-up, mode of operation. Upon such engagement further rotation of input cam shaft 410 and dog 460 causes rotation of feedback cam 440 and thus cam shaft 325 to set the inlet control valves 305 in the desired position. The relationship of these members will be more clearly understood in connection with a later discussion of FIGS. 4 through 7.

Under normal operation, the rotation of input shaft 405 in one direction rotates input cam shaft 410 through reduction gear box 415, thereby camming lever 425. The camming of lever 425 causes the pilot 370 to move upwardly. Upward movement of pilot 370 causes pilot oil from chamber 375 to be admitted to port 385 and by way of conduit 390 to the bottom of hydraulic cylinder 345 moving piston 350 and thus rack 337 upwardly to rotate cam shaft 325 in a clockwise direction. This causes clockwise movement of the cams 320 and sequential opening the inlet control valves 305.

Conversely, rotation of input shaft 405 in the opposite direction causes downward movement of pilot 370 to place land 370b below port 385 and permits pilot oil from hydraulic cylinder 345 to drain through conduit 390 and out the top of the bushing member 367 by way of drain conduit 400. Then, the biasing force from springs 331 urges cam shaft 325 in a counterclockwise direction, thus effecting closing the inlet control valves and effecting downward movement of the piston 350. The spring 335 effects overtravel to insure the availability of the full force of springs 331 against valves 305 to insure tight sealing of the valves.

Since each inlet control valve is cammed by an individual valve cam 320, the mechanical advantage associated with the valve operator of the present invention may be tailored so that no peaks will occur in a curve of opening force versus travel, as shown by the dotted line in FIG. 1. That is, cams 320 are shaped so that the mechanical advantage of the operator is varied as the valves are sequentially opened. Where the peaks would normally occur in this curve, as illustrated by the solid line in FIG. 1, the cams are shaped to increase the mechanical advantage by providing a slower movement of the valves relative to the angular movement of input shaft 405 during initial valve opening movement than during the remainder of the valve opening movement. This compensates for the extreme forces required to overcome the pressure drop across the valves during initial opening movement. Therefore, as the first of a sequence of inlet control valves begins to open, and extreme forces are required to overcome the pressure drop across the valve and the weight of the valve itself, this shaping of the corresponding cam to provide a predetermined mechanical advantage insures that the force necessary for opening that valve will be within tolerable limits. The cam for each successive inlet control valve is similarly shaped so that a relatively constant force applied to rack 337 is adequate to open the inlet control valves. This not only eliminates the requirements for heavy duty and thus costly hydraulics but, as will be seen, is of particular importance with the manual or back-up mode of operation of the valve operator of the present invention, because the maximum force required can be kept within the limits of the force which can be exerted by the average human being.

Figure 4:
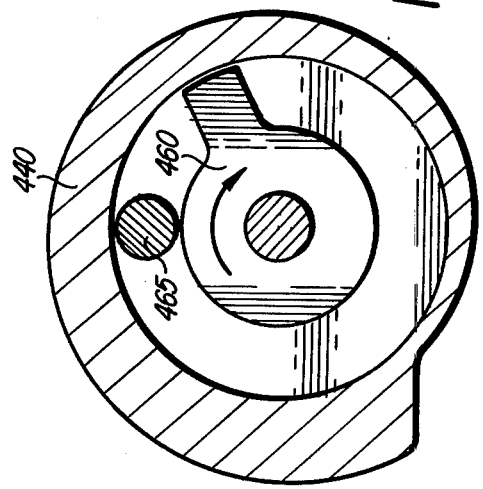
FIG. 4 is a view taken along line 3—3 of FIG. 2 in a configuration wherein the inlet control valves are opened in a hydraulic or power mode of operation.

Referring to FIG. 2 and more particularly to FIGS. 3 through 6, the relative positions of the feedback cam 440, the dog 460 and the 465 pin can be seen in both power and manual modes of operation. In FIG. 3, the dog 460 and the pin 465 occupy positions in which the inlet control valves are closed. Actuation of the input shaft 405 for opening the valves in the power mode of operation causes dog 460 to rotate clockwise to occupy the position shown in FIG. 4. However, piston 350 in hydraulic cylinder 345 moves rack 335 upwardly at a velocity sufficient to impart a rotational velocity to pinion 340, and hence to feedback cam 440 and pin 465, greater than the rotational velocity of dog 460 resulting from the manual input to input shaft 405 and input cam shaft 410. Therefore, as seen in FIG. 4, dog 460 moves approximately 90° during the opening of the inlet control valves; in the same period of time pin 465 moves approximately 270°. Therefore, in the power mode of operation the dog 460 does not engage the pin 465.

Figure 5:
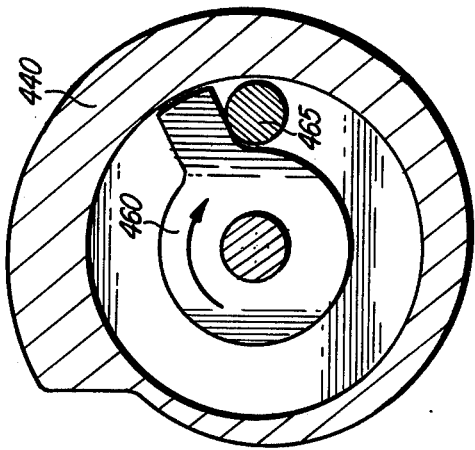
FIG. 5 is a view taken along line 3—3 of FIG. 2 in a configuration wherein the inlet control valves are closed and the valve operator of the present invention is being employed in a manual mode of operation to open the valves.
Figure 6:
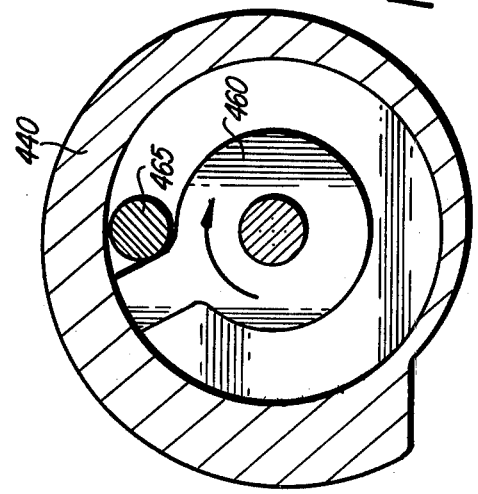
FIG. 6 is a view taken along line 3—3 of FIG. 2 in a configuration wherein the inlet control valves have been opened in a manual mode of operation of the inlet control valve operator of the present invention.

Now, assuming that the dog 460 and pin 465 occupy the positions shown in FIG. 3, and that the hydraulic means fails when it is desired to open the inlet control valves, dog 460 moves clockwise until it engages pin 465 as shown in FIG. 5. The feedback cam 440 and pin 465 have, of course, remained stationary because of the failure of the hydraulic means. From this point, the manual input to input shaft 405 causes dog 460 to rotate clockwise approximately 270° thereby causing a corresponding angular movement of pin 465, feedback cam 440 and cam shaft 325 to effect manual opening of the inlet control valves. The position of these parts when the valves are open is shown in FIG. 6. For closing the inlet control valves, input shaft 405 is turned in an opposite direction, causing dog 460 to rotate in an opposite direction and engage pin 465 on a side opposite to that shown in FIGS. 5 and 6. Continued movement of the input shaft 405 thereafter causes further movement of the pin 465, feedback cam 440 and cam shaft 325 to effect closing of the valves 305.

It can be seen from this description that the valve operator of the present invention allows the setting of inlet control valves in either a power, or hydraulic, mode of operation or a manual, or back-up, mode of operation from input to a single member, namely the input shaft 405. Should the hydraulic means fail, input to shaft 405 automatically actuates mechanical means to set the inlet control valves in any desired position.

In opening the inlet control valves in a manual mode of operation, the benefit of utilizing valve cams 320 rather than a lift bar for setting the inlet control valves 305 is particularly important. Since each cam may be shaped to provide a mechanical advantage characterized by a relatively constant input force to effect the movement of the inlet control valves, no "peaks" will appear in a curve of input force versus travel, thereby assuring that the input force required in this manual mode of operation remains consistent with the capabilities of human personnel throughout the inlet control valve opening operation.

While there has been shown what is considered to be the preferred embodiment of the present invention, other modifications may occur to those skilled in the art; and it is intended to cover in the appended claims all such modifications as fall within the true spirit and scope of the invention.

What is claimed as new and desired to be secured by Letters Patent of the United States is:

1. An operator for steam turbine inlet control valves, said operator comprising:
   (a) a cam shaft having disposed thereon in axially spaced relationship a plurality of valve cams, each arranged to effect movement of one of said valves;
   (b) hydraulic means for positioning said valve cams to effect opening and closing of the valves;
   (c) mechanical means for positioning said valve cams to effect opening and closing of the valves;
   (d) manual actuation means for actuating said hydraulic means to move said valve cams in a normal mode of operation, said manual actuation means normally being ineffective for actuating said mechanical means but automatically becoming effective to actuate said mechanical means in a back-up mode of operation in the event of failure of said hydraulic means; and
   (e) each of said cams being shaped to cause a relatively slower movement of the corresponding valve during the time of initial valve opening movement than during the remainder of the valve opening movement, thereby limiting the force required to be applied to said manual actuation means in the back-up mode of operation.

2. The operator of claim 1, wherein said cams are angularly displaced relative to each other to provide sequential opening of said valves.

3. The operator of claim 1, wherein said hydraulic means comprises:
   (a) an hydraulic actuator for moving said cam shaft to effect movement of said valves;

(b) control means for selectively supplying fluid to said hydraulic actuator to effect movement of said valves and for blocking the supply of fluid to said hydraulic actuator to stop movement of said valves;

(c) means for causing said control means to supply fluid to said hydraulic actuator in response to input to said manual actuation means; and (d) means responsive to a predetermined position of said valves for causing said control means to block the supply of pilot oil to said hydraulic actuator.

4. The operator of claim 3, wherein:

(a) said hydraulic actuator includes a cylinder and a piston movable in said cylinder; and further including (b) a shaft extending from said piston and having a rack mounted thereon; and (c) a pinion disposed on said cam shaft and engaged by said rack to effect movement of said cam shaft and said valves.

5. The operator of claim 4, wherein said control means comprises a pilot valve disposed in fluid communication with said cylinder.

6. The operator of claim 5, wherein said control means further includes:

(a) an input cam connected to and rotatable by said manual actuation means; and (b) a pivoted lever engaging said input cam and connected to said pilot valve for causing said pilot valve to supply pilot oil to said hydraulic actuator in response to movement of said input cam.

7. The operator of claim 5, wherein said means responsive to a predetermined position of said valves includes:

(a) a feedback cam connected to said cam shaft, the position of the feedback cam corresponding to the position of the inlet control valves; and (b) a pivoted lever engaging said feedback cam and connected to said pilot valve for causing said pilot valve to block the supply of pilot oil to said cylinder for terminating the movement of said valve cams when said inlet control valves reach a predetermined position.

8. The operator of claim 1, further including a plurality of cam followers, each of said cam followers being arranged to engage a corresponding one of said valve cams and connected to a corresponding one of said inlet control valves for effecting movement of said inlet control valves.

9. The operator of claim 8, wherein:

(a) each of said valves includes a valve stem connected to a corresponding one of said followers;

(b) and further including a plurality of biasing springs, each of said springs surrounding a corresponding one of said valve stems; and (c) said biasing springs urging said valves toward their closed positions and biasing said cam followers against said cams.

10. The operator of claim 9, and further including:

(a) an additional cam mounted on said cam shaft and shaped differently than said first-mentioned cams;

(b) a follower engaging said additional cam;

(c) means for biasing said follower against said additional cam; and (d) said last-named means effecting overtravel of said cam shaft to cause said plurality of cam followers to clear said first-mentioned cams whereby the full force of said biasing springs is effective to provide a tight seal of said valves in their closed position.

11. The operator of claim 8, wherein said mechanical means comprises:

(a) a dog connected to said manual actuation means and rotatable thereby; and (b) means disposed on said cam shaft and engageable by said dog when said operator is employed in a back-up mode of operation for effecting movement of said cam shaft and said inlet control valves.

12. The operator of claim 11, wherein said means disposed on said cam shaft and engageable by said dog comprises:

(a) a pin fixed to said feedback cam, said dog when in engagement with said pin causing rotation of said feedback cam to effect movement of said cam shaft and said inlet control valves.

13. The operator of claim 12, wherein said feedback cam is formed to include an internal chamber, wherein said dog is mounted within said chamber, and wherein said pin is mounted within said chamber in a position spaced from said cam shaft and extending parallel to said cam shaft.

* * * * *